US008774547B2

(12) United States Patent
Fujita et al.

(10) Patent No.: US 8,774,547 B2
(45) Date of Patent: Jul. 8, 2014

(54) CONTOUR CORRECTING DEVICE, CONTOUR CORRECTING METHOD AND VIDEO DISPLAY DEVICE

(75) Inventors: Nobuko Fujita, Osaka (JP); Satoru Tanigawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1345 days.

(21) Appl. No.: 12/529,463

(22) PCT Filed: Sep. 11, 2008

(86) PCT No.: PCT/JP2008/002520
§ 371 (c)(1),
(2), (4) Date: Sep. 1, 2009

(87) PCT Pub. No.: WO2009/037817
PCT Pub. Date: Mar. 26, 2009

(65) Prior Publication Data
US 2010/0104212 A1    Apr. 29, 2010

(30) Foreign Application Priority Data
Sep. 19, 2007   (JP) .................................. 2007-242130

(51) Int. Cl.
*G06K 9/40* (2006.01)
*G06K 9/46* (2006.01)

(52) U.S. Cl.
USPC ....... 382/263; 382/264; 382/266; 375/E7.061

(58) Field of Classification Search
USPC .................... 382/26–268; 375/264, 242, 286; 345/76; 348/606, 607, 610, 94, 125, 348/425
See application file for complete search history.

(56) References Cited

U.S. PATENT DOCUMENTS

| 4,839,726 | A | | 6/1989 | Balopole et al. |
| 5,384,602 | A | * | 1/1995 | Bossaert et al. ............. 348/628 |
| 6,266,102 | B1 | | 7/2001 | Azuma et al. |
| 6,419,632 | B1 | * | 7/2002 | Shiki et al. .................... 600/443 |
| 6,424,383 | B1 | * | 7/2002 | Terai et al. .................... 348/628 |
| 7,106,386 | B2 | | 9/2006 | Kobayashi |
| 7,224,405 | B2 | * | 5/2007 | Taguchi et al. ............... 348/607 |

(Continued)

FOREIGN PATENT DOCUMENTS

| JP | 05-219413 | 8/1993 |
| JP | 08-163406 | 6/1996 |

(Continued)

*Primary Examiner* — Chan Park
*Assistant Examiner* — Mai M Thomas
(74) *Attorney, Agent, or Firm* — McDermott Will & Emery LLP

(57) ABSTRACT

A contour correcting device which includes a plurality of delay elements which delay an input video signal, a pixel-selection-control-signal generation circuit, a pixel selection circuit which selects outputs of the plurality of delay elements in response to outputs of the pixel-selection-control-signal generation circuit, a high-pass filter operation circuit and an adder circuit which adds an operation result of the high-pass filter operation circuit to the input video signal. When the pixel selection circuit extracts a contour component in a boundary portion between a horizontal video effective period and a period other than the horizontal video effective period of the input video signal, the pixel selection circuit replaces pixel data in the period other than the horizontal video effective period among pixel data input to the high-pass filter operation circuit, with pixel data at an edge-point of the horizontal video effective period.

16 Claims, 8 Drawing Sheets

(56) References Cited

U.S. PATENT DOCUMENTS

| | | | |
|---|---|---|---|
| 7,228,003 B2* | 6/2007 | Brown | 382/266 |
| 7,315,661 B2* | 1/2008 | Lee | 382/300 |
| 7,359,567 B2* | 4/2008 | Gomi et al. | 382/266 |
| 7,430,021 B2* | 9/2008 | Nako et al. | 348/672 |
| 7,457,486 B2* | 11/2008 | Kawakami et al. | 382/312 |
| 7,479,991 B2* | 1/2009 | Wada | 348/223.1 |
| 7,831,107 B2* | 11/2010 | Dai et al. | 382/266 |
| 8,111,910 B2* | 2/2012 | Tanaka | 382/154 |
| 8,482,627 B2* | 7/2013 | Sekine | 348/222.1 |
| 2001/0024524 A1* | 9/2001 | So et al. | 382/238 |
| 2002/0191859 A1* | 12/2002 | Amano et al. | 382/266 |
| 2003/0053711 A1* | 3/2003 | Kim | 382/268 |
| 2003/0118248 A1* | 6/2003 | Kyong | 382/266 |
| 2003/0169941 A1* | 9/2003 | Lin et al. | 382/266 |
| 2004/0247167 A1* | 12/2004 | Bueno et al. | 382/132 |
| 2005/0068426 A1* | 3/2005 | Kawasaki et al. | 348/222.1 |
| 2005/0083438 A1* | 4/2005 | Taguchi et al. | 348/607 |
| 2005/0244063 A1* | 11/2005 | Kwon et al. | 382/233 |
| 2005/0285977 A1* | 12/2005 | Nako et al. | 348/672 |
| 2006/0017668 A1* | 1/2006 | Shirasaki et al. | 345/76 |
| 2007/0009171 A1* | 1/2007 | Nakashizuka et al. | 382/263 |
| 2007/0086667 A1* | 4/2007 | Dai et al. | 382/242 |
| 2007/0229676 A1* | 10/2007 | Tanaka et al. | 348/223.1 |
| 2008/0002910 A1* | 1/2008 | Ojima et al. | 382/277 |
| 2008/0056602 A1* | 3/2008 | Xue et al. | 382/268 |
| 2010/0061649 A1* | 3/2010 | Hou et al. | 382/263 |
| 2010/0278422 A1* | 11/2010 | Iketani | 382/165 |
| 2011/0142363 A1* | 6/2011 | Nojima et al. | 382/260 |

FOREIGN PATENT DOCUMENTS

| | | |
|---|---|---|
| JP | 11-088725 | 3/1999 |
| JP | 2001-285673 | 10/2001 |
| JP | 2003-150130 | 5/2003 |

* cited by examiner

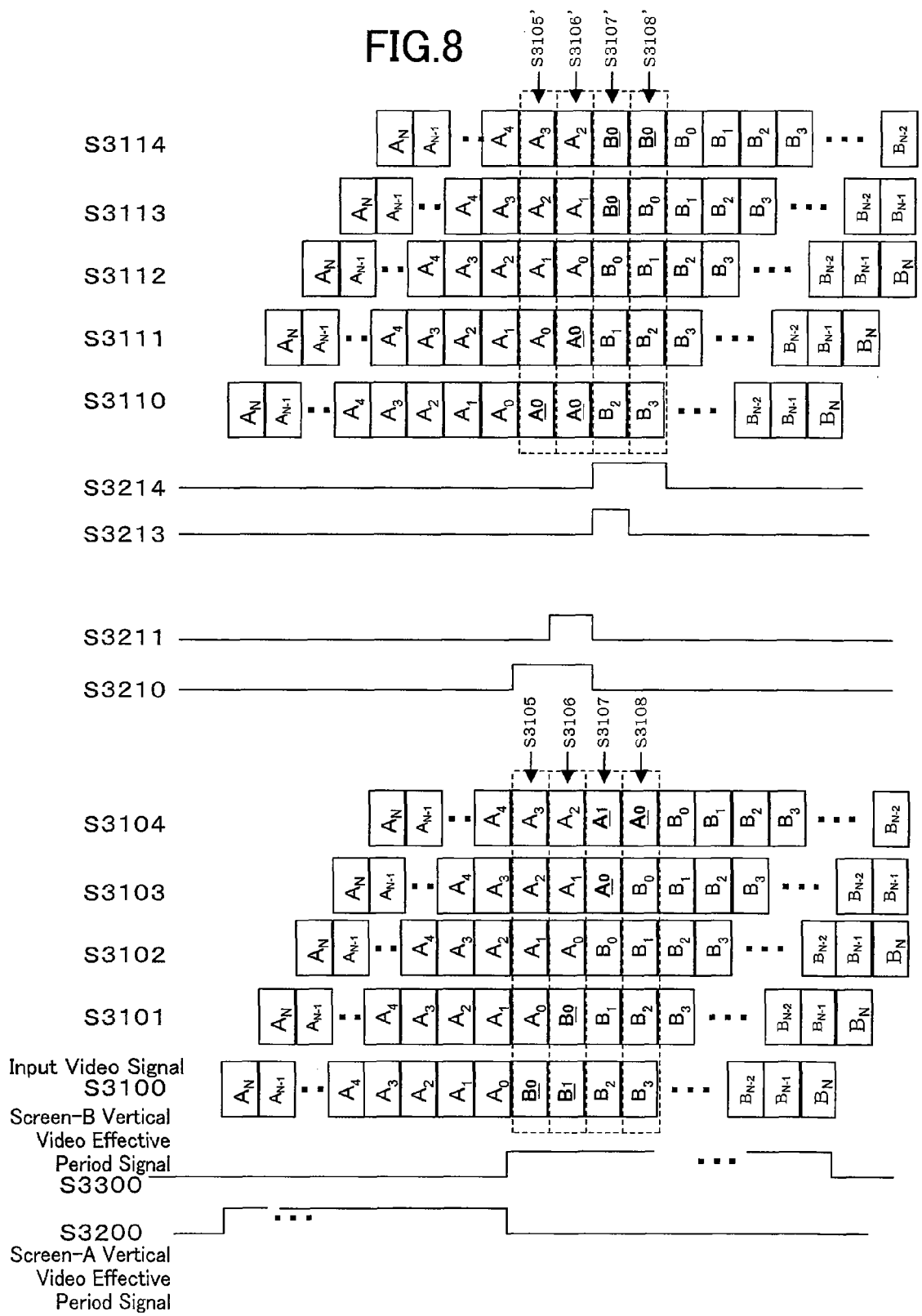

CONTOUR CORRECTING DEVICE, CONTOUR CORRECTING METHOD AND VIDEO DISPLAY DEVICE

RELATED APPLICATIONS

This application is the U.S. National Phase under 35 U.S.C. §371 of International Application No. PCT/JP2008/002520, filed on Sep. 11, 2008, which in turn claims the benefit of Japanese Application No. 2007-242130, files on Sep. 19, 2007, the disclosures of which Applications are incorporated by reference herein.

TECHNICAL FIELD

The present invention relates to technologies for correcting contour portions of video signals and for improving sharpness of video images.

BACKGROUND ART

In recent years, in video display devices such as television receivers, liquid crystal displays, and plasma displays, it has been common not only to faithfully reproduce video images, but also to improve sharpness by edge enhancement, in conjunction with improvement in image quality of video signals.

In addition, start of digital broadcasts and spread of multiple channel broadcasts have allowed for commercialization of many kinds of video display devices having multiple-screen display capability.

On the other hand, in contour correction technologies using edge enhancement, a contour correction component which is affected by a signal of a period other than a video effective period at a boundary between the video effective period and the period other than the video effective period is extracted, causing unnatural overcorrection in a boundary portion. Moreover, when a plurality of screens are displayed, a contour correction component in association with signals with no correlation of both screens A and B is extracted in a boundary portion between screens A and B, causing unnatural contour correction as well. In order to prevent such overcorrection in a peripheral portion of a screen and unnatural contour correction in a boundary portion between a plurality of screens, for example, video display devices which deactivate contour correction in peripheral portions of a screen and in boundary portions between a plurality of screens are proposed in Patent Document 1.

Patent Document 1: Japanese Unexamined Patent Application Publication No. H11-088725

DISCLOSURE OF INVENTION

Technical Problem

However, although the technologies of Patent Document 1 can prevent overcorrection due to extraction of a contour correction component which is affected by a signal of a period other than a video effective period in a peripheral portion of a screen (at a boundary between a video effective period and a period other than the video effective period), and unnatural correction due to extraction of a contour component using a video signal with no correlation in a boundary portion between a plurality of screens, a contour-correction deactivated area exists in a peripheral portion of a screen and a boundary portion between a plurality of screens, thereby causing video image with blurred edges and lacking sharpness in the contour-correction deactivated area. Therefore, the contour-correction deactivated area and the contour-correction activated area provide different appearances.

Moreover, although there is such a way as to decrease an effect (a gain) of contour correction in peripheral portions of a screen or in boundary portions between a plurality of screens, it only decreases an effect of overcorrection or unnatural correction with no correlation by means of gain adjustment, and unnatural correction itself still occurs.

Although peripheral portions of a screen will create no problem when used in an overscan condition where the video display area is smaller than the video effective area such as in CRTs, if the display area for a video signal and the display area of a display portion are identical such as in digital display devices such as plasma display panels and liquid crystal display panels, the contour-correction deactivated area in peripheral portions of a screen, or an area where gain adjustment of overcorrection has been performed, is also displayed.

The present invention has been made to solve the aforementioned problems, and an objective of the present invention is to provide a contour correcting method and device which can perform appropriate contour correction on the entire area of an input video signal.

Means for Solving the Problems

A contour correcting device of the present invention includes a plurality of delay elements which delay an input video signal, a pixel-selection-control-signal generation circuit, a pixel selection circuit which selects outputs of the plurality of delay elements in response to outputs of the pixel-selection-control-signal generation circuit, a high-pass filter operation circuit which weights and adds or subtracts pixel data selected by the pixel selection circuit, and an adder circuit which adds an operation result of the high-pass filter operation circuit to the input video signal. The pixel selection circuit, when extracting a contour component in a boundary portion between a horizontal video effective period and a period other than the horizontal video effective period of the input video signal, replaces pixel data in the period other than the horizontal video effective period among pixel data input to the high-pass filter operation circuit, with pixel data at an edge-point of the horizontal video effective period.

With the above contour correcting device, appropriate horizontal contour correction, which is not affected by pixel data in a period other than a horizontal video effective period in a peripheral portion of a screen as well, can be performed on the entire area of an input video signal.

In addition, a contour correcting device of the present invention includes a plurality of line delay elements which generate line delays to an input video signal, a line-selection-control-signal generation circuit, a line selection circuit which selects outputs of the plurality of line delay elements in response to outputs of the line-selection-control-signal generation circuit, a vertical high-pass filter operation circuit which weights and adds or subtracts pixel data of lines selected by the line selection circuit, and an adder circuit which adds an operation result of the vertical high-pass filter operation circuit to the input video signal. The line selection circuit, when extracting a contour component in a boundary line between a vertical video effective period and a period other than the vertical video effective period of the input video signal, replaces pixel data of one or more lines in the period other than the vertical video effective period among pixel data of lines input to the vertical high-pass filter operation circuit, each with pixel data at an edge-point line of the vertical video effective period.

With the above contour correcting device, appropriate vertical contour correction, which is not affected by pixel data of a line in a period other than a vertical video effective period in a peripheral portion of a screen as well, can be performed on the entire area of an input video signal.

Moreover, in an above contour correcting device, the input video signal is a video signal for displaying a plurality of screens (screens A and B), and when the plurality of screens are displayed and contour components are extracted in a boundary portion between screens A and B, in cases where a contour component for a boundary pixel in screen A is extracted, the pixel selection circuit replaces pixel data of screen B among pixel data input to the high-pass filter operation circuit with pixel data at an end-point of screen A, and in cases where a contour component for a boundary pixel in screen B is extracted, the pixel selection circuit replaces pixel data of screen A among pixel data input to the high-pass filter operation circuit with pixel data at an end-point of screen B.

With the above contour correcting device, appropriate horizontal contour correction, which is not affected by pixel data of another screen with no correlation in a boundary portion between screens A and B as well, can be performed.

Furthermore, in an above contour correcting device, the input video signal is a video signal for displaying a plurality of screens (screens A and B), and when the plurality of screens are displayed and contour components are extracted in a boundary line between screens A and B, in cases where a contour component in screen A is extracted, the line selection circuit replaces pixel data of one or more lines of screen B among pixel data of lines input to the vertical high-pass filter operation circuit, each with pixel data of a line at an end-point of screen A, and in cases where a contour component in screen B is extracted, the line selection circuit replaces pixel data of one or more lines of screen A among pixel data of lines input to the vertical high-pass filter operation circuit, each with pixel data of a line at an end-point of screen B.

With the above contour correcting device, appropriate vertical contour correction, which is not affected by pixel data of another screen with no correlation in a boundary portion between screens A and B as well, can be performed.

Advantages

According to the present invention, appropriate horizontal contour correction, which is not affected by pixel data in a period other than a horizontal video effective period in a peripheral portion of a screen as well, can be performed on the entire area of an input video signal.

In addition, appropriate vertical contour correction, which is not affected by pixel data of a line in a period other than a vertical video effective period in a peripheral portion of a screen as well, can be performed on the entire area of an input video signal.

Moreover, when a plurality of screens are displayed, appropriate horizontal contour correction, which is not affected by pixel data of another screen with no correlation in a boundary portion between screens A and B as well, can be performed.

Furthermore, when a plurality of screens are displayed, appropriate vertical contour correction, which is not affected by pixel data of another screen with no correlation in a boundary portion between screens A and B as well, can be performed.

BRIEF DESCRIPTION OF DRAWINGS

FIG. 8 illustrates signal data and line data output from respective portions of the contour correcting device shown in FIG. 7.

EXPLANATION OF REFERENCE SYMBOLS

100, 1100, 2100, 3100: Video Input Terminal
200: Horizontal Video Effective Period Input Terminal
300, 1300, 2400, 3400: Video Output Terminal
400, 1400, 2500, 3500: Video Display Device
101, 102, 103, 104, 2101, 2102, 2103, 2104: Delay Element
110, 2110: Pixel Selection Circuit
120, 2120: High-pass Filter Operation Circuit
201, 2201: Pixel-Selection-Control-Signal Generation Circuit
202, 1202, 2202, 3202: Adder Circuit
1200: Vertical Video Effective Period Input Terminal
1101, 1102, 1103, 1104, 3101, 3102, 3103, 3104: Line Delay Element
1110, 3110: Line Selection Circuit
1120, 3120: Vertical High-pass Filter Operation Circuit
1201, 3201: Line-Selection-Control-Signal Generation Circuit
2200: Screen-A Horizontal Video Effective Period Input Terminal
2300: Screen-B Horizontal Video Effective Period Input Terminal
3200: Screen-A Vertical Video Effective Period Input Terminal
3300: Screen-B Vertical Video Effective Period Input Terminal

BEST MODE FOR CARRYING OUT THE INVENTION

Preferred embodiments of the present invention are described below with reference to the drawings.

(First Embodiment)

A horizontal contour correcting device in accordance with the first embodiment is described below using FIGS. 1 and 2. In the first embodiment, in a pixel selection circuit, one or more pixels in a period other than a horizontal video effective period among a required tap length of pixels used for a high-pass filter operation are each replaced with a pixel at an edge-point of the horizontal video effective period (a boundary pixel), so that appropriate contour correction which is not affected by a signal in the period other than the horizontal video effective period in a peripheral portion of a screen as well is performed.

Figure 1:
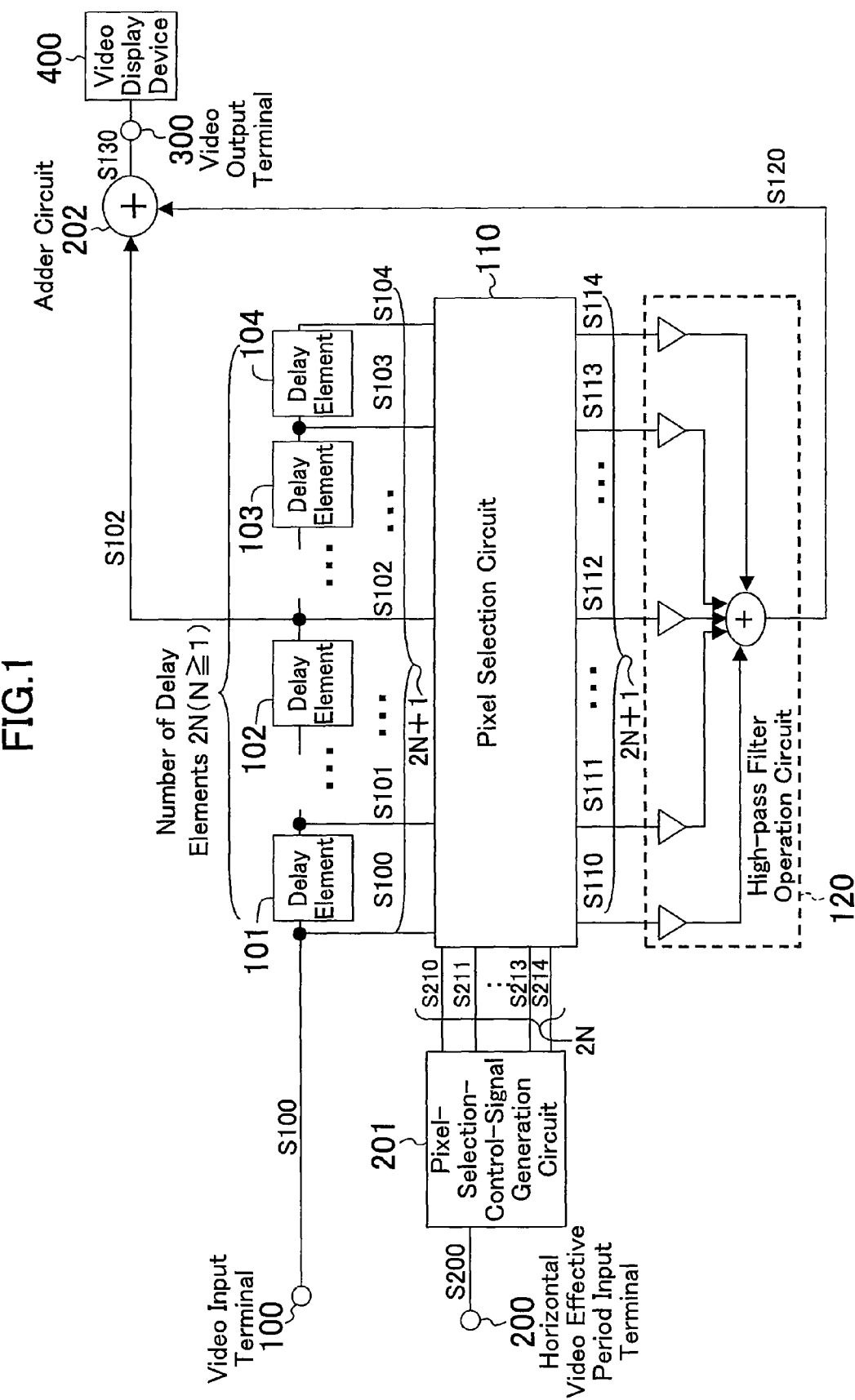
FIG. 1 is a block diagram showing the structure of a horizontal contour correcting device in accordance with the first embodiment of the present invention.

FIG. 1 is a block diagram showing the structure of a contour correcting device in accordance with the first embodiment. In FIG. 1, a video input terminal 100 is an input terminal for a video signal S100 on which contour enhancement will be performed. A video output terminal 300 is an output terminal for a video signal S130 on which contour enhancement has been performed. A video display device 400 displays the video signal S130 output from the output terminal 300. A horizontal video effective period input terminal 200 is an input terminal for a signal S200 which represents a horizontal video effective period corresponding to the video signal S100. 2N stages (where N≥1) of delay elements 101, ..., 102, ..., 103, and 104 delay the input video signal S100. Here, each of the 2N stages of delay elements 101, ..., 102, ..., 103, and 104 is a flip-flop which delays the input signal to the delay element itself by a unit time of sampling (hereinafter referred to as "1T") and then outputs the same. In this case, the delay element 102 is the Nth delay element. A pixel-selection-control-signal generation circuit 201 takes the horizontal video effective period signal S200 as an input, and outputs 2N control signals S210, S211, ..., and S214 which control pixel selection at a boundary between the horizontal video effective period and the period other than the horizontal video effective period.

A pixel selection circuit 110 takes, as inputs, (2N+1) pixel data, which are the input video signal S100 and respective outputs S101, ..., S102, ..., S103, and S104 of the 2N stages of delay elements 101, ..., 102, ..., 103, and 104, selects pixel data in response to the 2N pixel selection control signals S210, S211, ..., S213, and S214, and outputs (2N+1) pixel data S110, S111, ..., S112, ..., S113, and S114. In this case, output selection for the pixel data S110 is performed by the control signal S210; output selection for the pixel data S111 is performed by the control signal S211; ...; and output selection for the pixel data S114 is performed by the control signal S214. There is no control signal for output selection for the pixel data S112, and the output S102 of the Nth delay element 102 is directly output as the pixel data S112. A high-pass filter operation circuit 120 takes (2N+1) outputs S110, S111, ..., S112, ..., S113, and S114 of the pixel selection circuit 110 as inputs, and outputs a contour enhancement signal S120 as a result of a filter operation. The high-pass filter operation circuit 120 is a filter circuit which can be expressed by, for example, Transfer Function: $A(z)=a_0+a_1 Z^{-1}+a_2 Z^{-2}+\ldots+a_{2n}Z^{-2n}$, extracts a signal having a bandwidth for which correction is desired, by multiplying the (2N+1) input pixel data S110, S111, ..., S112, ..., S113, and S114 respectively by a factor for weighting and by adding or subtracting them, and calculates the contour enhancement signal S120 for the output S102, which is a contour enhancement target pixel, of the Nth delay element 102.

The number 2N of the delay elements is determined by a tap length required in the high-pass filter operation circuit 120. For example, when a filter operation is desired using 2T pixel data both before and after the pixel data S102 for which correction is desired, the tap length required in the high-pass filter operation circuit 120 is 5 taps, and the number of the delay elements is determined as 4 (N=2). Alternatively, when a filter operation is desired using 3T pixel data both before and after the pixel data S102 for which correction is desired, the tap length required in the high-pass filter operation circuit 120 is 7 taps, and the number of the delay elements is determined as 6 (N=3).

In an adder circuit 202, the contour enhancement signal S120 is added to the output S102, which is a contour enhancement target pixel, of the Nth delay element 102. The video signal S130 on which contour enhancement has been performed is output from the output terminal 300, and displayed in the video display device 400.

Next, operation of a contour correcting device as configured above is described with reference to FIG. 2. FIG. 2 illustrates signal data and pixel data output from respective portions of a contour correcting device in accordance with the first embodiment. Here, a case where the tap length required in the high-pass filter operation circuit 120 is 5 taps, and the number of the delay elements is 4 (N=2) is described as an example.

Figure 2:
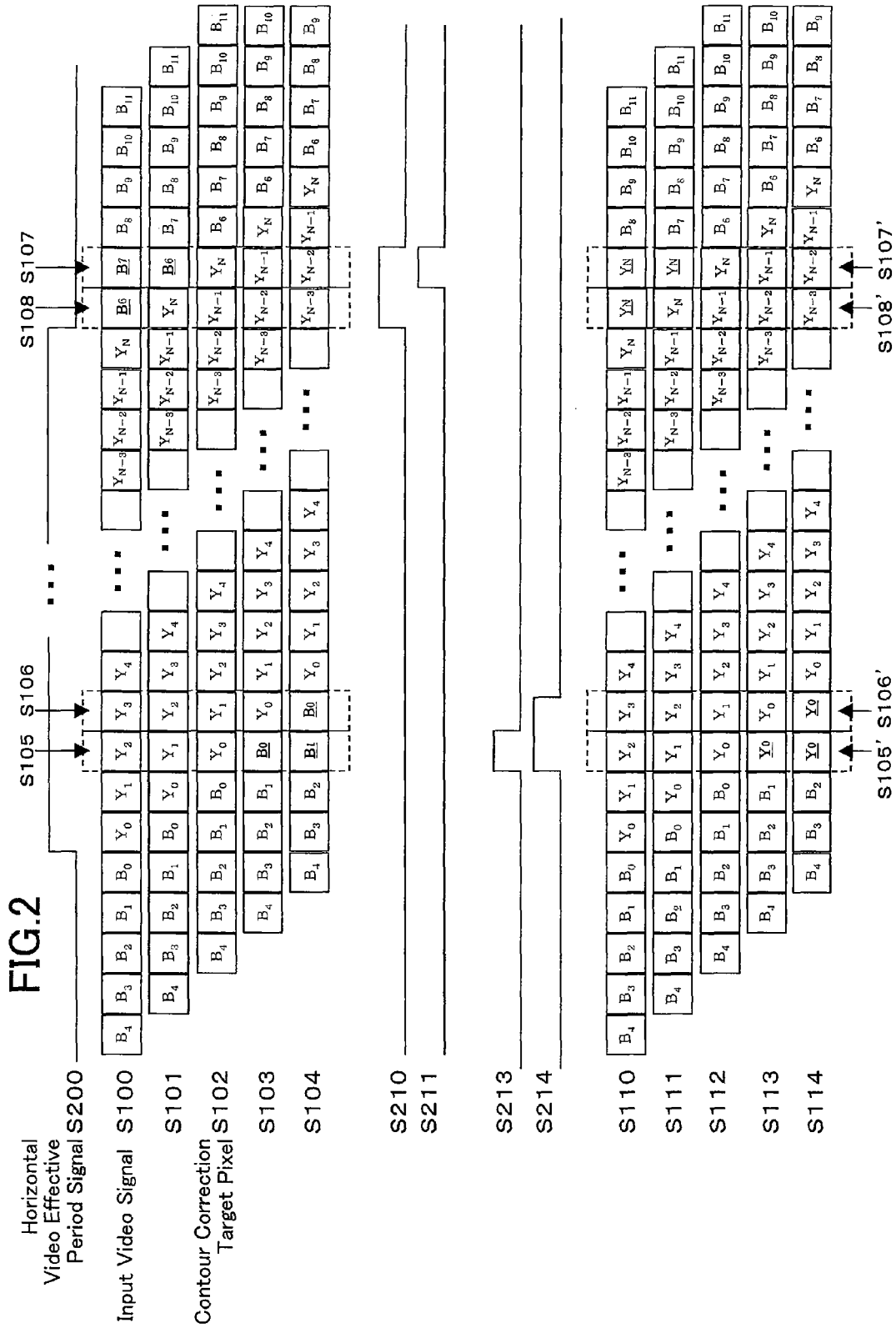
FIG. 2 illustrates signal data and pixel data output from respective portions of the contour correcting device shown in FIG. 1.

First, a video signal S100 as shown in FIG. 2 is input to the input terminal 100. Pixel data $B_0$ to $B_{11}$ of the video signal S100 represent pixels in a period other than a horizontal video effective period, and pixel data $Y_0$, $Y_1$ to $Y_{N-1}$, and $Y_N$ represent pixels in the horizontal video effective period. The video signal S100 is input to 4 stages of delay elements 101 to 104 in sequential order, and is made to be the pixel data S101, S102, S103, and S104 which are successively delayed by 1T. The pixel data S102 which is positioned at the center of delayed positions among the video signal S100 and the delayed pixel data S101, S102, S103, and S104 is the contour correction target pixel data.

In this case, if the video signal S100 and the delayed pixel data S101, S102, S103, and S104 are directly input to the high-pass filter operation circuit 120, a pixel group S105 having 5 taps of $Y_2$, $Y_1$, $Y_0$, $B_0$, and $B_1$ is used for an arithmetic operation of the correction enhancement signal S120 corresponding to a left edge-point pixel $Y_0$ of the horizontal video effective period, and a pixel group S106 having 5 taps of $Y_3$, $Y_2$, $Y_1$, $Y_0$, and $B_0$ is used for an arithmetic operation of the correction enhancement signal S120 corresponding to $Y_1$. In addition, a pixel group S107 having 5 taps of $B_7$, $B_6$, $Y_N$, $Y_{N-1}$, and $Y_{N-2}$ is used for an arithmetic operation of the correction enhancement signal S120 corresponding to a right edge-point pixel $Y_N$ of the horizontal video effective period, and a pixel group S108 having 5 taps of $B_6$, $Y_N$, $Y_{N-1}$, $Y_{N-2}$, and $Y_{N-3}$ is used for an arithmetic operation of the correction enhancement signal S120 corresponding to $Y_{N-1}$. In this case, the pixel data $B_0$, $B_1$, $B_6$, and $B_7$ in the period other than the horizontal video effective period are used for calculation of the correction enhancement signal S120 corresponding to edge-point pixels $Y_0$, $Y_1$, $Y_N$, and $Y_{N-1}$ in the horizontal video effective period.

In general, since a pixel data in a period other than a horizontal video effective period is a signal with low brightness and at near black level, the brightness level changes widely in a boundary portion between the period other than the horizontal video effective period and the horizontal video effective period. Consequently, the boundary portion is extracted as a contour component and correction is performed, and the brightness level of the pixel data in the boundary portion in the horizontal video effective period receives an overshoot, causing white and glaring video image when displayed in the video display device 400.

In order to solve such a problem, selection of pixel data to be input to the high-pass filter operation circuit 120 is performed in the pixel selection circuit 110. The method of pixel selection is described below.

In FIGS. 2, S210, S211, S213, and S214 are 4 control signals generated in and output from the pixel-selection-control-signal generation circuit 201 from the horizontal video effective period signal S200. S110, S111, S112, S113, and S114 are pixel data output from the pixel selection circuit 110.

S210 is a control signal which performs selection control of the pixel data S110, and becomes HIGH during a 2T section immediately after the horizontal video effective period signal S200 was set to LOW, i.e., during a section in which the correction enhancement signal S120 corresponding to the right edge-point pixels $Y_N$ and $Y_{N-1}$ of the horizontal video effective period is in an arithmetic operation. S211 is a control signal which performs selection control of the pixel data S111, and becomes HIGH during a 1T section, 1T after the horizontal video effective period signal S200 was set to LOW, i.e., during a section in which the correction enhancement signal S120 corresponding to the right edge-point pixel $Y_N$ of the horizontal video effective period is in an arithmetic operation. S213 is a control signal which performs selection control of the pixel data S113, and becomes HIGH during a 1T section, 2T after the horizontal video effective period signal S200 was set to HIGH, i.e., during a section in which the correction enhancement signal S120 corresponding to the left edge-point pixel $Y_0$ of the horizontal video effective period is in an arithmetic operation. S214 is a control signal which performs selection control of the pixel data S114, and becomes HIGH during a 2T section, 2T after the horizontal video effective period signal S200 was set to HIGH, i.e., during a section in which the correction enhancement signal S120 corresponding to the left edge-point pixels $Y_0$ and $Y_1$ of the horizontal video effective period is in an arithmetic operation.

S110, S111, S112, S113, and S114 are outputs of the pixel selection circuit 110. For S111, the pixel selection circuit 110 selects S101 when the control signal S211 is LOW, and selects S102 when HIGH. In addition, for S110, the pixel selection circuit 110 selects S100 when the control signal S210 is LOW, and selects S111 when HIGH. Moreover, for S113, the pixel selection circuit 110 selects S103 when the control signal S213 is LOW, and selects S102 when HIGH. Furthermore, for S114, the pixel selection circuit 110 selects S104 when the control signal S214 is LOW, and selects S113 when HIGH. And, the pixel selection circuit 110 directly outputs S102 as S112.

Accordingly, a pixel group S105' having 5 taps of $Y_2, Y_1, Y_0, Y_0$, and $Y_0$ is used for the arithmetic operation of the correction enhancement signal S120 corresponding to the left edge-point pixel $Y_0$ of the horizontal video effective period; a pixel group S106' having 5 taps of $Y_3, Y_2, Y_1, Y_0$, and $Y_0$ is used for the arithmetic operation of the correction enhancement signal S120 corresponding to $Y_1$; a pixel group S107' having 5 taps of $Y_N, Y_N, Y_N, Y_{N-1}$, and $Y_{N-2}$ is used for the arithmetic operation of the correction enhancement signal S120 corresponding to the right edge-point pixel $Y_N$ of the horizontal video effective period; and a pixel group S108' having taps of $Y_N, Y_N, Y_{N-1}, Y_{N-2}$, and $Y_{N-3}$ is used for the arithmetic operation of the correction enhancement signal S120 corresponding to $Y_{N-1}$, so that the correction enhancement signal S120 which is not affected by pixel data in the period other than the horizontal video effective period can be obtained.

As described above, when calculating the correction enhancement signal S120 for edge-point pixels of the horizontal video effective period, contour correction which is not affected by pixel data in the period other than the horizontal video effective period can be performed by controlling the pixel data S110 to S114 input to the high-pass filter operation circuit 120 in response to the control signal S210 to S214.

Note that, in the first embodiment, the high-pass filter operation circuit 120 may be a second-order differential circuit which calculates an average difference between a contour correction target pixel and pixels before and after the pixel.

Note that, in the first embodiment, the period other than the horizontal video effective period may be a blanking period.

Note that, in the first embodiment, when, for example, a video signal with an aspect ratio of 4:3 is displayed in a screen with an aspect ratio of 16:9, and black belts (so called "side panels") appear in right- and left-periphery portions of the screen, the period other than the horizontal video effective period may be the black belt zones appeared in the video display area.

In addition, in the first embodiment, although the horizontal video effective period signal S200 which represents the horizontal video effective period is input from the outside into the input terminal 200, a circuit may be provided which detects the horizontal video effective period from the input video signal S100 so that a horizontal video effective period signal from this detecting circuit will be input to the pixel-selection-control-signal generation circuit 201.

(Second Embodiment)

A vertical contour correcting device in accordance with the second embodiment is described below using FIGS. 3 and 4. In the second embodiment, in a line selection circuit, pixel data of one or more lines in a period other than a vertical video effective period among a required tap length of lines used for a vertical high-pass filter operation are each replace with pixel data of an edge-point line of the vertical video effective period (a boundary line), so that appropriate vertical contour correction which is not affected by pixel data of one or more lines in the period other than the vertical video effective period in a peripheral portion of a screen as well is performed.

Figure 3:
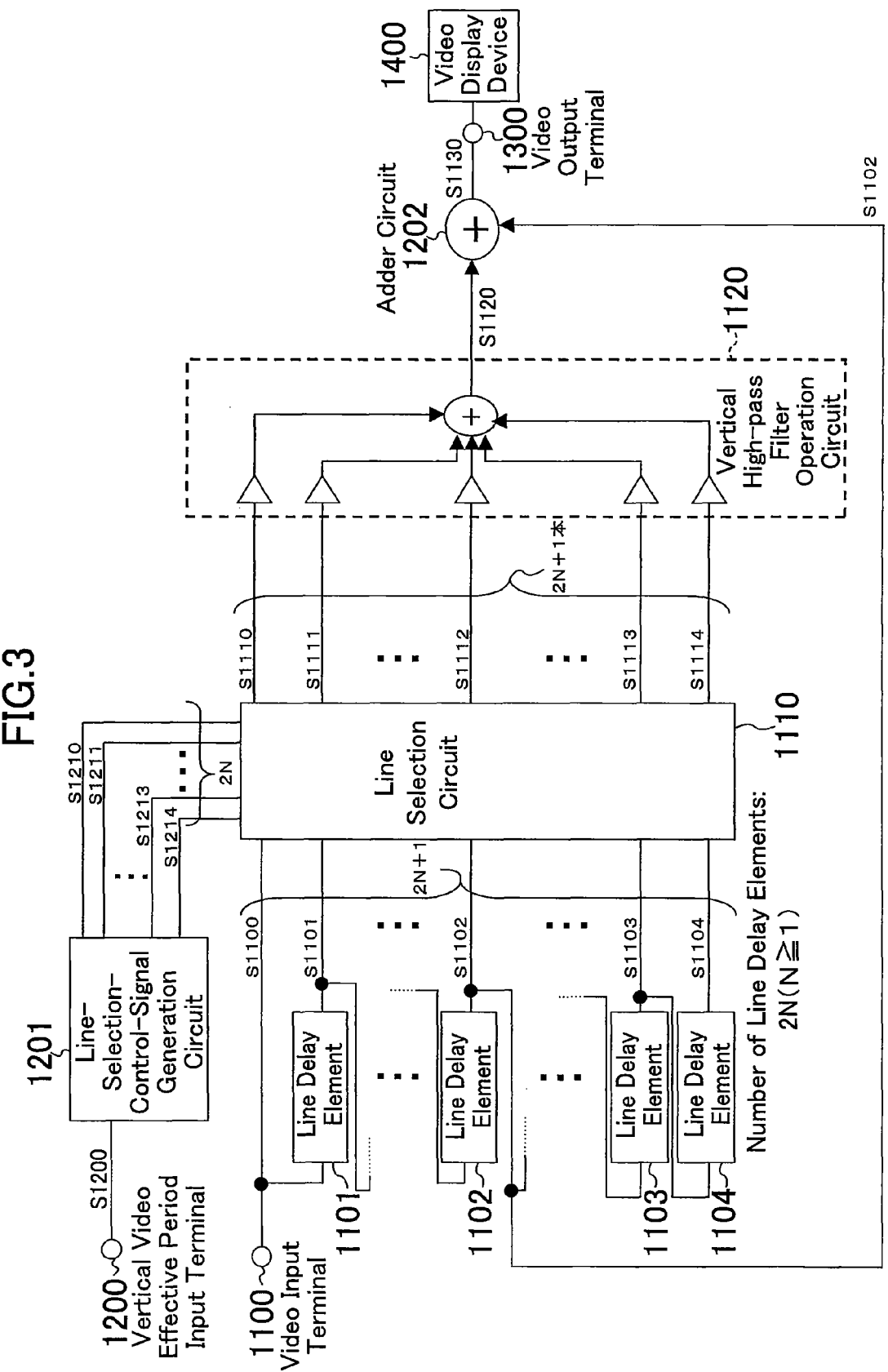
FIG. 3 is a block diagram showing the structure of a vertical contour correcting device in accordance with the second embodiment of the present invention.

FIG. 3 is a block diagram showing the structure of a contour correcting device in accordance with the second embodiment. In FIG. 3, a video input terminal 1100 is an input terminal for a video signal S1100 on which vertical contour enhancement will be performed. A video output terminal 1300 is an output terminal for a video signal S1130 on which vertical contour enhancement has been performed. A video display device 1400 displays the video signal output from the output terminal 1300. A vertical video effective period input terminal 1200 is an input terminal for a signal S1200 which represents a vertical video effective period corresponding to the video signal S1100.

2N stages (where N≥1) of line delay elements 1101, . . . , 1102, . . . , 1103, and 1104 generate line delays to the input video signal S1100. Here, each of the 2N stages of line delay elements 1101, . . . , 1102, . . . , 1103, and 1104 is a line memory which delays the input signal to the line delay element itself by a line unit (hereinafter referred to as "1 line (1H)"). In this case, the line delay element 1102 is the Nth line delay element. A line-selection-control-signal generation circuit 1201 takes the vertical video effective period signal S1200 as an input, and outputs 2N control signals S1210, S1211, . . . , S1213, and S1214 which control line selection at a boundary between a line in a vertical video effective period and a line in a period other than the vertical video effective period.

A line selection circuit 1110 takes, as inputs, (2N+1) lines of line pixel data, which are the input video signal S1100 and respective outputs S1101, . . . , S1102, . . . , S1103, and S1104 of the 2N stages of line delay elements 1101, . . . , 1102, . . . , 1103, and 1104, selects line pixel data in response to the 2N line selection control signals S1210, S1211, . . . , S1213, and S1214, and outputs (2N+1) lines of line pixel data S1110, S1111, . . . , S1112, . . . , S1113, and S1114. In this case, output selection for the line pixel data S1110 is performed by the control signal S1210; output selection for the line pixel data S1111 is performed by the control signal S1211; . . . ; and selection for the line pixel data S1114 is performed by the control signal S1214. There is no control signal for output selection for the line pixel data S1112, and the output S1102 of the Nth line delay element 1102 is directly output as the line pixel data S1112. A vertical high-pass filter operation circuit 1120 takes the (2N+1) lines of outputs S1110, S1111, ..., S1112, ..., S1113, and S1114 of the line selection circuit 1110 as inputs, and outputs a vertical contour enhancement signal S1120 as a result of a filter operation. For example, the vertical high-pass filter operation circuit 1120 extracts a signal having a bandwidth for which correction is desired, by multiplying the (2N+1) pixel data corresponding to one in horizontal direction for each line respectively by a factor for weighting, and by adding or subtracting them, and calculates the vertical contour enhancement signal S1120 for the output S1102, which is a vertical contour enhancement target line, of the Nth line delay element 1102.

The number 2N of the line delay elements is determined by a tap length required in the vertical high-pass filter operation circuit 1120. For example, when a filter operation is desired using 2 lines of line pixel data both before and after the line pixel data S1102 for which correction is desired, the tap length required in the vertical high-pass filter operation circuit 1120 is 5 lines, and the number of the line delay elements is determined as 4 (N=2). Alternatively, when a filter operation is desired using 3 lines of line pixel data both before and after the line pixel data S1102 for which correction is desired, the tap length required in the vertical high-pass filter operation circuit 1120 is 7 lines, and the number of the line delay elements is determined as 6 (N=3).

In an adder circuit 1202, the vertical contour enhancement signal S1120 is added to the output S1102, which is a vertical contour enhancement target line, of the Nth line delay element 1102. The video signal S1130 on which vertical contour enhancement has been performed is output from the output terminal 1300, and displayed in the video display device 1400.

Next, operation of a contour correcting device as configured above is described with reference to FIG. 4. FIG. 4 illustrates signal data and line data output from respective portions of a contour correcting device in accordance with the second embodiment. Here, a case where the tap length required in the vertical high-pass filter operation circuit 1120 is 5 lines, and the number of the line delay elements is 4 (N=2) is described as an example.

Figure 4:
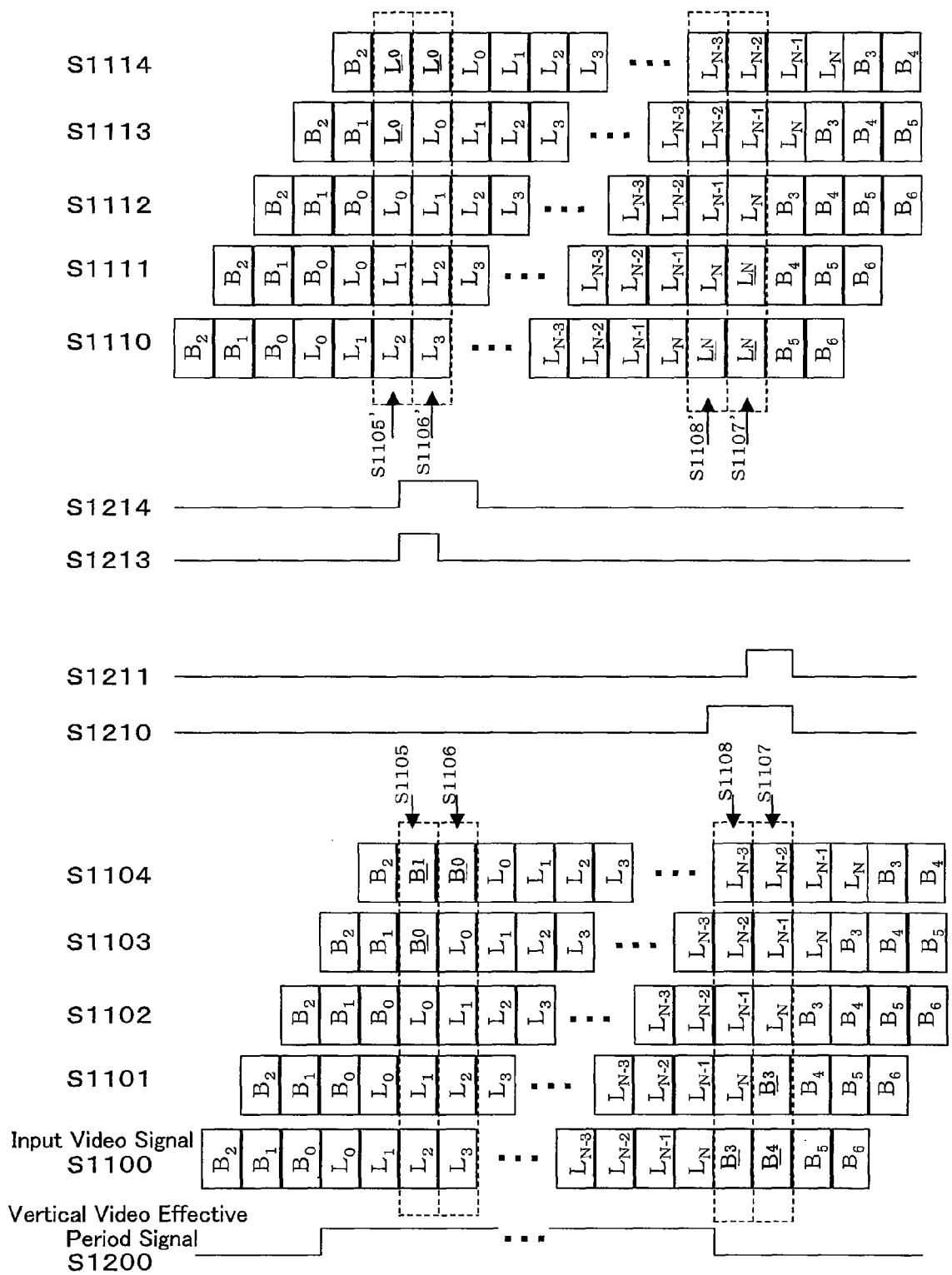
FIG. 4 illustrates signal data and line data output from respective portions of the contour correcting device shown in FIG. 3.

First, a video signal S1100 as shown in FIG. 4 is input to the input terminal 1100. Components $B_0$ to $B_6$ and $L_0$ to $L_N$ of the video signal S1100 respectively represent line data. Line data $B_0$ to $B_6$ of the video signal S1100 represent lines in a period other than a vertical video effective period, and line data $L_0$, $L_1$ to $L_{N-1}$, and $L_N$ represent lines in the vertical video effective period. The video signal S1100 is input to 4 stages of line delay elements 1101 to 1104 in sequential order, and is made to be the line data S1101, S1102, S1103, and S1104 which are successively delayed by 1 line (1H). The line data S1102 which is positioned at the center of line delayed positions among the video signal S1100 and the delayed line data S1101, S1102, S1103, and S1104 is the vertical contour correction target line.

In this case, if the video signal S1100 and the delayed line data S1101, S1102, S1103, and S1104 are directly input to the vertical high-pass filter operation circuit 1120, a line group S1105 having 5 taps of $L_2$, $L_1$, $L_0$, $B_0$, and $B_1$ is used for an arithmetic operation of the vertical contour enhancement signal S1120 corresponding to an upper edge-point line $L_0$ of the screen of the vertical video effective period, and a line group S1106 having 5 taps of $L_3$, $L_2$, $L_1$, $L_0$, and $B_0$ is used for an arithmetic operation of the vertical contour correction enhancement signal S1120 corresponding to $L_1$. In addition, a line group S1107 having 5 taps of $B_4$, $B_3$, $L_N$, $L_{N-1}$, and $L_{N-2}$ is used for an arithmetic operation of the vertical contour correction enhancement signal S1120 corresponding to a lower edge-point line $L_N$ of the screen of the vertical video effective period, and a line group S1108 having 5 taps of $B_3$, $L_N$, $L_{N-1}$, $L_{N-2}$, and $L_{N-3}$ is used for an arithmetic operation of the vertical contour correction enhancement signal S1120 corresponding to $L_{N-1}$. In this case, lines $B_0$, $B_1$, $B_3$, and $B_4$ in the period other than the vertical video effective period are used for calculation of the vertical correction enhancement signal S1120 corresponding to edge-point lines $L_0$, $L_1$, $L_N$, and $L_{N-1}$ in the vertical video effective period.

In general, since line data in a period other than a vertical video effective period is a signal with low brightness and at near black level, the brightness level changes widely in a boundary portion between a line in the period other than the vertical video effective period and a line in the vertical video effective period. Consequently, the boundary portion is extracted as a vertical contour component and contour correction is performed, and the brightness level of the line data in the boundary portion in the vertical video effective period increases, causing white and glaring video image when displayed in the video display device 1400.

In order to solve such a problem, selection of line data to be input to the vertical high-pass filter operation circuit 1120 is performed in the line selection circuit 1110. The method of line selection is described below.

In FIG. 4, S1210, S1211, S1213, and S1214 are 4 control signals generated in and output from the line-selection-control-signal generation circuit 1201 from the vertical video effective period signal S1200. S1110, S1111, S1112, S1113, and S1114 are line pixel data output from the line selection circuit 1110. S1210 is a control signal which performs selection control of the line pixel data S1110, and becomes HIGH during a 2-line section immediately after the vertical video effective period signal S1200 was set to LOW, i.e., during a line section in which the vertical correction enhancement signal S1120 corresponding to the lower edge-point lines $L_N$ and $L_{N-1}$ of the vertical video effective period is in an arithmetic operation. S1211 is a control signal which performs selection control of the line pixel data S1111, and becomes HIGH during a 1-line section, 1 line after the vertical video effective period signal S1200 was set to LOW, i.e., during a section in which the vertical correction enhancement signal S1120 corresponding to lower edge-point line $L_N$ of the vertical video effective period is in an arithmetic operation. S1213 is a control signal which performs selection control of the line pixel data S1113, and becomes HIGH during a 1-line section, 2 lines after the vertical video effective period signal S1200 was set to HIGH, i.e., during a section in which the vertical correction enhancement signal S1120 corresponding to the upper edge-point line $L_0$ of the vertical video effective period is in an arithmetic operation. S1214 is a control signal which performs selection control of the line pixel data S1114, and becomes HIGH during a 2-line section, 2 lines after the vertical video effective period signal S1200 was set to HIGH, i.e., during a section in which the vertical correction enhancement signal S1120 corresponding to the upper edge-point pixels $L_0$ and $L_1$ of the vertical video effective period is in an arithmetic operation.

S1110, S1111, S1112, S1113, and S1114 are outputs of the line selection circuit 1110. For S1111, the line selection circuit 1110 selects S1101 when the control signal S1211 is LOW, and selects S1102 when HIGH. In addition, for S1110, the line selection circuit 1110 selects S1100 when the control signal S1210 is LOW, and selects S1111 when HIGH. Moreover, for S1113, the line selection circuit 1110 selects S1103 when the control signal S1213 is LOW, and selects S1102 when HIGH. Furthermore, for S1114, the line selection circuit 1110 selects S1104 when the control signal S1214 is LOW, and selects S1113 when HIGH. And, the line selection circuit 1110 directly outputs S1102 as S1112.

Accordingly, a line group S1105' having 5 taps of $L_2$, $L_1$, $L_0$, $L_0$, and $L_0$ is used for the arithmetic operation of the vertical correction enhancement signal S1120 corresponding to the upper edge-point line $L_0$ of the vertical video effective period; a line group S1106' having 5 taps of $L_3$, $L_2$, $L_1$, $L_0$, and $L_0$ is used for the arithmetic operation of the vertical correction enhancement signal S1120 corresponding to $L_1$; a line group S1107' having 5 taps of $L_N$, $L_N$, $L_N$, $L_{N-1}$ and $L_{N-2}$ is used for the arithmetic operation of the vertical correction enhancement signal S1120 corresponding to the lower edge-point line $L_N$ of the vertical video effective period; and a line group S1108' having 5 taps of $L_N$, $L_N$, $L_{N-1}$, $L_{N-2}$, and $L_{N-3}$ is used for the arithmetic operation of the vertical correction enhancement signal S1120 corresponding to $L_{N-1}$, so that the vertical correction enhancement signal S1120 which is not affected by line data in the period other than the vertical video effective period can be obtained.

As described above, when calculating the vertical correction enhancement signal S1120 for edge-point lines of the vertical video effective period, contour correction which is not affected by line data in the period other than the vertical video effective period can be performed by controlling the line data S1110 to S1114 input to the vertical high-pass filter operation circuit 1120 in response to the control signal S1210 to S1214.

Note that, in the second embodiment, the vertical high-pass filter operation circuit 1120 may be a vertical second-order differential circuit which calculates an average difference between a contour correction target line and lines before and after the line.

Note that, in the second embodiment, the period other than the vertical video effective period may be a vertical blanking period.

Note that, in the second embodiment, when, for example, a video signal with an aspect ratio of 16:9 is displayed in a screen with an aspect ratio of 4:3, and black belts (so called "letterboxes") appear in upper- and lower-periphery portions of the screen, the period other than the vertical video effective period may be the black belt zones appeared in the video display area.

Also note that, in the second embodiment, although the vertical video effective period signal S1200 which represents the vertical video effective period is input from the outside into the input terminal 1200, a detecting circuit may be provided which detects the vertical video effective period from the input video signal S1100 so that a vertical video effective period signal from this detecting circuit will be input to the line-selection-control-signal generation circuit 1201.

(Third Embodiment)

A horizontal contour correcting device in accordance with the third embodiment is described below using FIGS. 5 and 6. In the third embodiment, when a plurality of screens (for example, screens A and B) are displayed, in cases where a contour correction component for a boundary pixel in screen A is extracted, one or more pixels of screen B components among a required tap length of pixels used in a high-pass filter for contour extraction are each replaced with an edge-point pixel of screen A area (a boundary pixel), and in cases where a contour component for a boundary pixel in screen B is extracted, one or more pixels of screen A components among a required tap length of pixels used in a high-pass filter for contour extraction are each replaced with an edge-point pixel of screen B area (a boundary pixel), thus contour extraction which is affected by a video signal of another screen with no correlation is prevented in a boundary portion between screens A and B as well, so that appropriate contour correction is performed in an area including a boundary portion between a plurality of screens.

Figure 5:
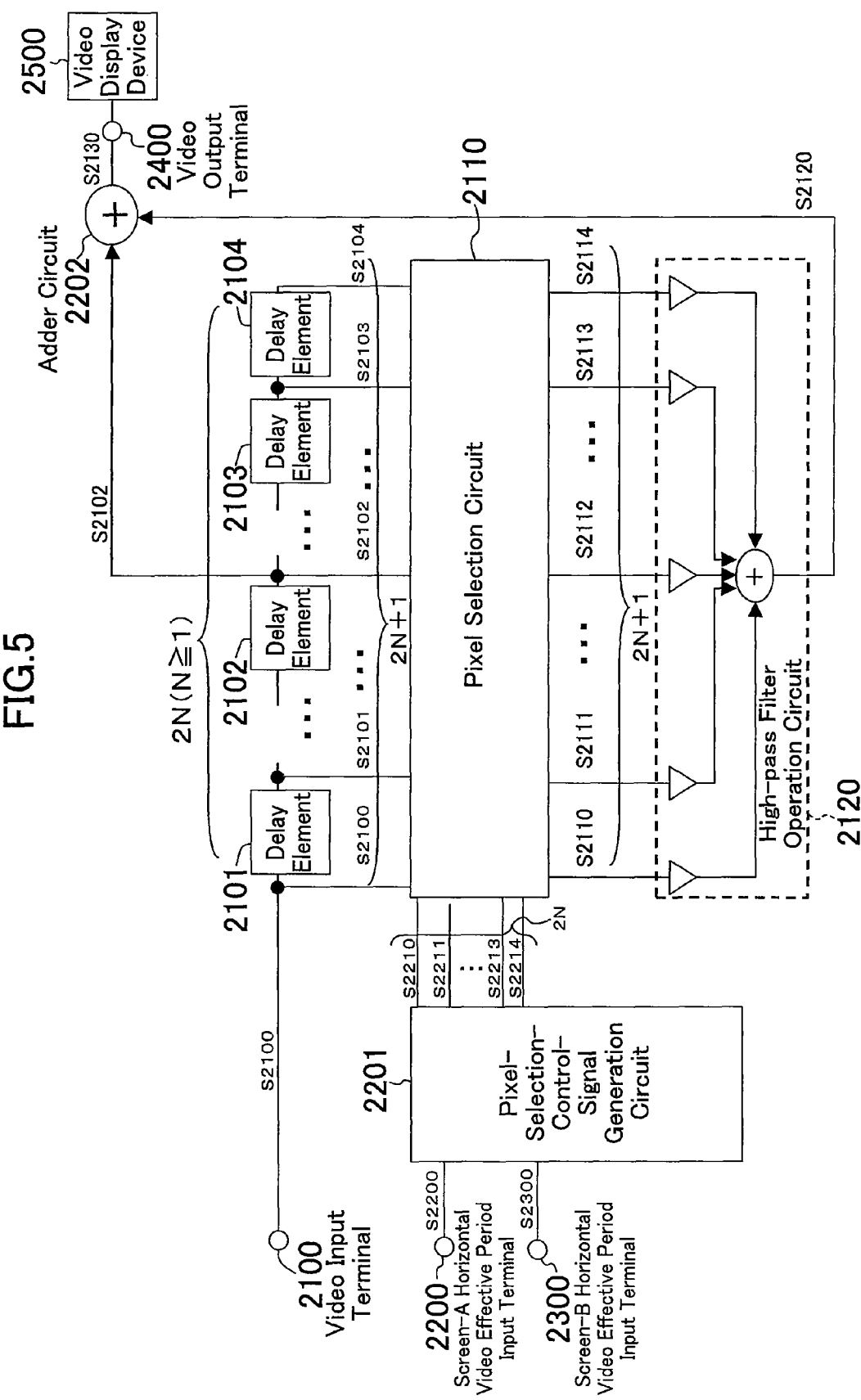
FIG. 5 is a block diagram showing the structure of a horizontal contour correcting device in accordance with the third embodiment of the present invention.

FIG. 5 is a block diagram showing the structure of a horizontal contour correcting device in accordance with the third embodiment. Here, a case where 2 screens of screen A and screen B are displayed is described as an example.

In FIG. 5, a video input terminal 2100 is an input terminal for a video signal S2100 which is a two-screen signal and on which contour enhancement will be performed. A video output terminal 2400 is an output terminal for a video signal S2130 on which contour enhancement has been performed. A video display device 2500 displays the video signal S2130 output from the output terminal 2400. An input terminal 2200 is an input terminal for a screen-A horizontal video effective period signal S2200 which represents a horizontal video effective period of screen A of the two-screen video signal S2100. An input terminal 2300 is an input terminal for a screen-B horizontal video effective period signal S2300 which represents a horizontal video effective period of screen B of the two-screen video signal S2100. 2N stages (where N≥1) of delay elements 2101, ..., 2102, ..., 2103, and 2104 delay the input video signal S2100. Here, each of the 2N stages of delay elements 2101, ..., 2102, ..., 2103, and 2104 is a flip-flop which delays the input signal to the delay element itself by a unit time of sampling (hereinafter referred to as "1T") and then outputs the same. In this case, the delay element 2102 is the Nth delay element. A pixel-selection-control-signal generation circuit 2201 takes the screen-A horizontal video effective period signal S2200 and the screen-B horizontal video effective period signal S2300 as inputs, and outputs 2N control signals S2210, S2211, ..., and S2214 which control pixel selection at a boundary between screens A and B.

A pixel selection circuit 2110 takes, as inputs, (2N+1) pixel data, which are the input video signal S2100 and respective outputs S2101, ..., S2102, ..., S2103, and S2104 of the 2N stages of delay elements 2101, ..., 2102, ..., 2103, and 2104, selects pixel data in response to the 2N pixel selection control signals S2210, S2211, ..., and S2214, and outputs (2N+1) pixel data S2110, S2111, ..., S2112, ..., S2113, and S2114. In this case, output selection for the pixel data S2110 is performed by the control signal S2210; output selection for the pixel data S2111 is performed by the control signal S2211; ...; and output selection for the pixel data S2114 is performed by the control signal S2214. There is no control signal for output selection for the pixel data S2112, and the output S2102 of the Nth delay element 2102 is directly output as the pixel data S2112. A high-pass filter operation circuit 2120 takes (2N+1) outputs S2110, S2111, ..., S2112, ..., S2113, and S2114 of the pixel selection circuit 2110 as inputs, and outputs a contour enhancement signal S2120 as a result of a filter operation. The high-pass filter operation circuit 2120 is a filter circuit which can be expressed by, for example, Transfer Function: $A(z) = a_0 + a_1 Z^{-1} + a_2 Z^{-2} + \ldots + a_{2n} Z^{2n}$, extracts a signal having a bandwidth for which correction is desired, by multiplying the (2N+1) input pixel data S2110, S2111, ..., S2112, ..., S2113, and S2114 respectively by a factor for weighting and by adding or subtracting them, and calculates the contour enhancement signal S2120 for the output S2102, which is a contour enhancement target pixel, of the Nth delay element 2102.

The number 2N of the delay elements is determined by a tap length required in the high-pass filter operation circuit 2120. For example, when a filter operation is desired using 2T pixel data both before and after the pixel data S2102 for which correction is desired, the tap length required in the high-pass filter operation circuit 2120 is 5 taps, and the number of the delay elements is determined as 4 (N=2). Alternatively, when a filter operation is desired using 3T pixel data both before and after the pixel data S2102 for which correction is desired, the tap length required in the high-pass filter operation circuit 2120 is 7 taps, and the number of the delay elements is determined as 6 (N=3).

In an adder circuit 2202, the contour enhancement signal S2120 is added to the output S2102, which is a contour enhancement target pixel, of the Nth delay element 2102. The video signal S2130 on which contour enhancement has been performed is output from the output terminal 2400, and displayed in the video display device 2500.

Next, operation of a contour correcting device as configured above is described with reference to FIG. 6. FIG. 6 illustrates signal data and pixel data output from respective portions of a contour correcting device in accordance with the third embodiment. Here, a case where the tap length required in the high-pass filter operation circuit 2120 is 5 taps, and the number of the delay elements is 4 (N=2) is described as an example.

Figure 6:
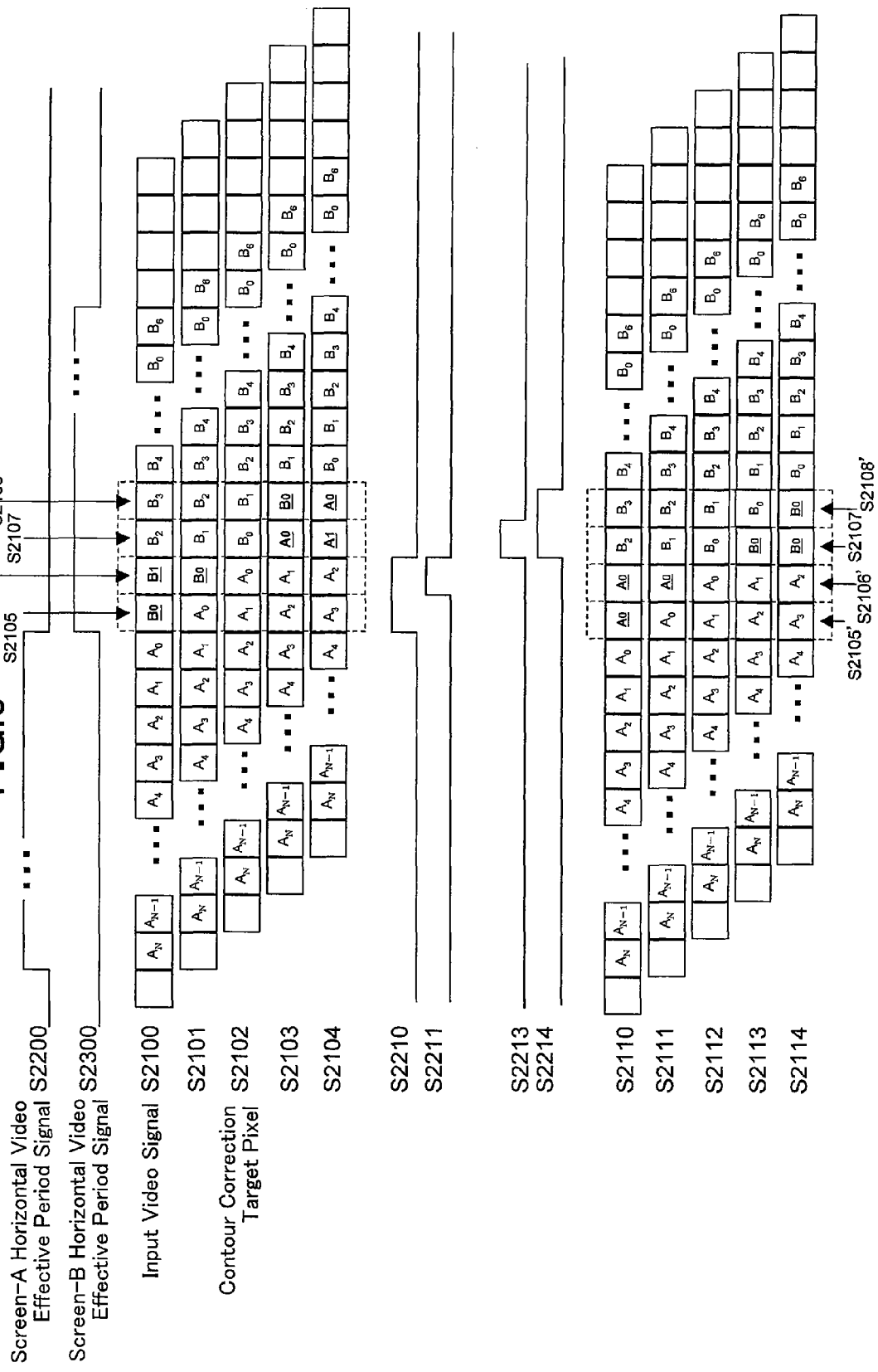
FIG. 6 illustrates signal data and pixel data output from respective portions of the contour correcting device shown in FIG. 5.

First, a two-screen video signal S2100 as shown in FIG. 6 is input to the input terminal 2100. Pixel data $A_0$ to $A_N$ of the video signal S2100 represent pixels of screen A, and pixel data $B_0$ to $B_N$ represent pixels of screen B. The video signal S2100 is input to 4 stages of delay elements 2101 to 2104 in sequential order, and is made to be the pixel data S2101, S2102, S2103, and S2104 which are successively delayed by 1T. The pixel data S2102 which is positioned at the center of delayed positions among the video signal S2100 and the delayed pixel data S2101, S2102, S2103, and S2104 is the contour correction target pixel data.

In this case, if the video signal S2100 and the delayed pixel data S2101, S2102, S2103, and S2104 are directly input to the high-pass filter operation circuit 2120, a pixel group S2106 having 5 taps of $B_1$, $B_0$, $A_0$, $A_1$, and $A_2$ is used for an arithmetic operation of the correction enhancement signal S2120 corresponding to a right edge-point pixel $A_0$ of screen A, and a pixel group S2105 having 5 taps of $B_0$, $A_0$, $A_1$, $A_2$, and $A_3$ is used for an arithmetic operation of the correction enhancement signal S2120 corresponding to $A_1$. In addition, a pixel group S2107 having 5 taps of $B_2$, $B_1$, $B_0$, $A_0$, and $A_1$ is used for an arithmetic operation of the correction enhancement signal S2120 corresponding to a left edge-point pixel $B_0$ of screen B, and a pixel group S2108 having 5 taps of $B_3$, $B_2$, $B_1$, $B_0$, and $A_0$ is used for an arithmetic operation of the correction enhancement signal S2120 corresponding to $B_1$. In this case, pixel data $B_0$ and $B_1$ in screen B are used for calculation of the correction enhancement signal S2120 corresponding to pixels $A_0$ and $A_1$ of edge-points in screen A. Also, pixel data $A_0$ and $A_1$ in screen A are used for calculation of the correction enhancement signal S2120 corresponding to pixels $B_0$ and $B_1$ of edge-points in screen B. If screens A and B are video signals which have no correlation, a contour component on which an arithmetic operation has been performed using video signals with no correlation is extracted and then correction is performed, so that a boundary portion between screens A and B becomes video image on which unnatural contour correction is performed.

In order to solve such a problem, selection of pixel data to be input to the high-pass filter operation circuit 2120 is performed in the pixel selection circuit 2110. The method of pixel selection is described below.

In FIG. 6, S2210, S2211, S2213, and S2214 are 4 control signals generated in and output from the pixel-selection-control-signal generation circuit 2201 from the screen-A horizontal video effective period signal S2200 and the screen-B horizontal video effective period signal S2300. S2110, S2111, S2112, S2113, and S2114 are pixel data output from the pixel selection circuit 2110. S2210 is a control signal which performs selection control of the pixel data S2110, and becomes HIGH during a 2T section immediately after the screen-A horizontal video effective period signal S2200 was set to LOW, i.e., during a section in which the correction enhancement signal S2120 corresponding to the right edge-point pixels $A_0$ and $A_1$ of screen A is in an arithmetic operation. S2211 is a control signal which performs selection control of the pixel data S2111, and becomes HIGH during a 1T section, 1T after the screen-A horizontal video effective period signal S2200 was set to LOW, i.e., during a section in which the correction enhancement signal S2120 corresponding to the right edge-point pixel $A_0$ of screen A is in an arithmetic operation. S2213 is a control signal which performs selection control of the pixel data S2113, and becomes HIGH during a 1T section, 2T after the screen-B horizontal video effective period signal S2300 was set to HIGH, i.e., during a section in which the correction enhancement signal S2120 corresponding to the left edge-point pixel $B_0$ of screen B is in an arithmetic operation. S2214 is a control signal which performs selection control of the pixel data S2114, and becomes HIGH during a 2T section, 2T after the screen-B horizontal video effective period signal S2300 was set to HIGH, i.e., during a section in which the correction enhancement signal S2120 corresponding to the left edge-point pixels $B_0$ and $B_1$ of screen B is in an arithmetic operation.

S2110, S2111, S2112, S2113, and S2114 are outputs of the pixel selection circuit 2110. For S2111, the pixel selection circuit 2110 selects S2101 when the control signal S2211 is LOW, and selects S2102 when HIGH. In addition, for S2110, the pixel selection circuit 2110 selects S2100 when the control signal S2210 is LOW, and selects S2111 when HIGH. Moreover, for S2113, the pixel selection circuit 2110 selects S2103 when the control signal S2213 is LOW, and selects S2102 when HIGH. Furthermore, for S2114, the pixel selection circuit 2110 selects S2104 when the control signal S2214 is LOW, and selects S2113 when HIGH. And, the pixel selection circuit 2110 directly outputs S2102 as S2112.

Accordingly, a pixel group S2106' having 5 taps of $A_0$, $A_0$, $A_0$, $A_1$, and $A_2$ is used for the arithmetic operation of the correction enhancement signal S2120 corresponding to the right edge-point pixel $A_0$ of screen A; a pixel group S2105' having 5 taps of $A_0$, $A_0$, $A_1$, $A_2$, and $A_3$ is used for the arithmetic operation of the correction enhancement signal S2120 corresponding to $A_1$; a pixel group S2107' having 5 taps of $B_2$, $B_1$, $B_0$, $B_0$, and $B_0$ is used for the arithmetic operation of the correction enhancement signal S2120 corresponding to the left edge-point pixel $B_0$ of screen B; and a pixel group S2108' having 5 taps of $B_3$, $B_2$, $B_1$, $B_0$, and $B_0$ is used for the arithmetic operation of the correction enhancement signal S2120 corresponding to $B_1$, so that the correction enhancement signal S2120 which is not affected by pixel data of another screen can be obtained.

As described above, when calculating the correction enhancement signal S2120 for edge-point pixels of the 2 screens, contour correction which is not affected by pixel data of another screen with no correlation can be performed by controlling the pixel data S2110 to S2114 input to the high-pass filter operation circuit 2120 in response to the control signal S2210 to S2214.

Note that, in the third embodiment, the high-pass filter operation circuit 2120 may be a second-order differential circuit which calculates an average difference between a contour correction target pixel and pixels before and after the pixel.

(Fourth Embodiment)

A vertical contour correcting device in accordance with the fourth embodiment is described below using FIGS. 7 and 8. In the fourth embodiment, when a plurality of screens (for example, screens A and B) are displayed, in cases where a contour correction component for a boundary line in screen A is extracted, one or more lines of screen B among a required tap length of lines used in a high-pass filter for contour extraction are each replaced with an edge-point line of screen A area (a boundary line), and in cases where a contour correction component for a boundary line in screen B is extracted, one or more lines of screen A among a required tap length of lines used in a high-pass filter for contour extraction are each replaced with an edge-point line of screen B area (a boundary line), thus contour extraction which is affected by a video signal of another screen with no correlation is prevented in a boundary portion between screens A and B as well, so that appropriate vertical contour correction is performed in an area including a boundary portion between a plurality of screens.

Figure 7:
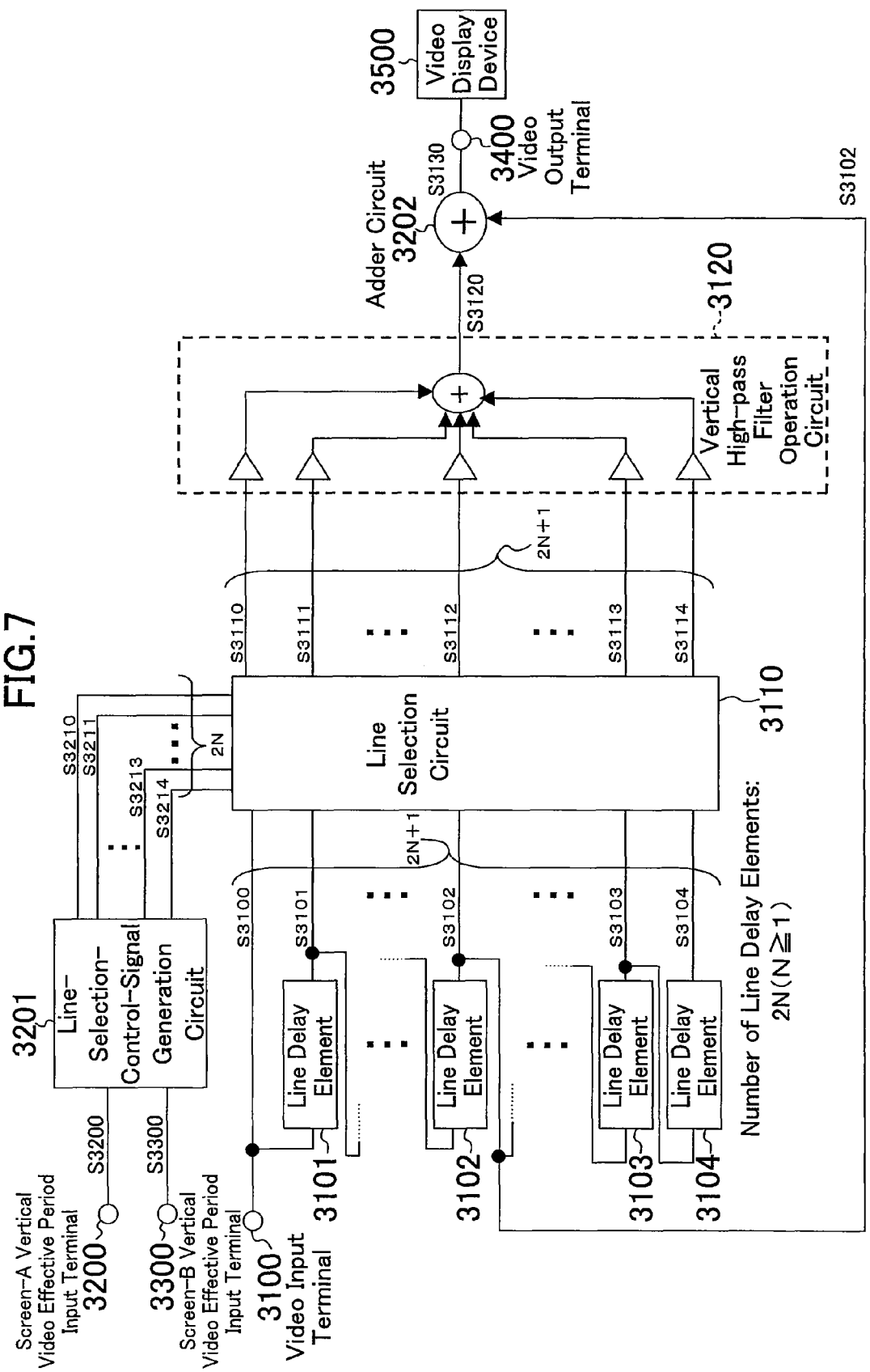
FIG. 7 is a block diagram showing the structure of a vertical contour correcting device in accordance with the fourth embodiment of the present invention.

FIG. 7 is a block diagram showing the structure of a vertical contour correcting device in accordance with the fourth embodiment. Here, a case where 2 screens of screen A and screen B are displayed is described as an example.

In FIG. 7, a video input terminal 3100 is an input terminal for a video signal S3100 which is a two-screen signal and on which contour enhancement will be performed. A video output terminal 3400 is an output terminal for a video signal S3130 on which contour enhancement has been performed. A video display device 3500 displays the video signal output from the output terminal 3400. An input terminal 3200 is an input terminal for a screen-A vertical video effective period signal S3200 which represents a vertical video effective period of screen A of the two-screen video signal S3100. An input terminal 3300 is an input terminal for a screen-B vertical video effective period signal S3300 which represents a vertical video effective period of screen B of the two-screen video signal S3100. 2N stages (where N≥1) of line delay elements 3101, . . . , 3102, . . . , 3103, and 3104 generate line delays to the input video signal S3100. Here, each of the 2N stages of line delay elements 3101, . . . , 3102, . . . , 3103, and 3104 is a line memory which delays the input signal to the line delay element itself by a line unit time (hereinafter referred to as "1 line (1H)"). In this case, the line delay element 3102 is the Nth line delay element. A line-selection-control-signal generation circuit 3201 takes the screen-A vertical video effective period signal S3200 and the screen-B vertical video effective period signal S3300 as inputs, and outputs 2N control signals S3210, S3211, . . . , S3213, and S3214 which control line selection at a boundary between screens A and B.

A line selection circuit 3110 takes, as inputs, (2N+1) line data which are the input video signal S3100 and respective outputs S3101, . . . , S3102, . . . , S3103, and S3104 of the 2N stages of line delay elements 3101, . . . , 3102, . . . , 3103, and 3104, selects line data in response to the 2N line selection control signals S3210, S3211, . . . , S3213, and S3214, and outputs (2N+1) line data S3110, S3111, . . . , S3112, . . . , S3113, and S3114. In this case, output selection for the line data S3110 is performed by the control signal S3210; output selection for the line data S3111 is performed by the control signal S3211; . . . ; and selection for the line data S3114 is performed by the control signal S3214. There is no control signal for output selection for the line data S3112, and the output S3102 of the Nth line delay element 3102 is directly output as the line data S3112. A vertical high-pass filter operation circuit 3120 takes the (2N+1) outputs S3110, S3111, . . . , S3112, . . . , S3113, and S3114 of the line selection circuit 3110 as inputs, and outputs a vertical contour enhancement signal S3120 as a result of a filter operation. For example, the vertical high-pass filter operation circuit 3120 extracts a signal having a bandwidth for which correction is desired, by multiplying pixels corresponding to ones in horizontal direction in the (2N+1) line data S3110, S3111, . . . , S3113, and S3114 respectively by a factor for weighting, and by adding or subtracting them, and calculates the vertical contour enhancement signal S3120 for the output S3102, which is a vertical contour enhancement target line, of the Nth line delay element 3102.

The number 2N of the line delay elements is determined by a tap length required in the vertical high-pass filter operation circuit 3120. For example, when a filter operation is desired using 2 lines of line data both before and after the line S3102 for which correction is desired, the tap length required in the vertical high-pass filter operation circuit 3120 is 5 taps, and the number of the line delay elements is determined as 4 (N=2). Alternatively, when a filter operation is desired using 3 lines of line data both before and after the line data S3102 for which correction is desired, the tap length required in the vertical high-pass filter operation circuit 3120 is 7 taps, and the number of the line delay elements is determined as 6 (N=3).

In an adder circuit 3202, the vertical contour enhancement signal S3120 is added to the output S3102, which is a contour enhancement target line, of the Nth line delay element 3102. The video signal S3130 on which vertical contour enhancement has been performed is output from the output terminal 3400, and displayed in the video display device 3500.

Next, operation of a contour correcting device as configured above is described with reference to FIG. 8. FIG. 8 illustrates signal data and line data output from respective portions of a contour correcting device in accordance with the fourth embodiment. Here, a case where the tap length required in the vertical high-pass filter operation circuit 3120 is 5 lines, and the number of the delay elements is 4 (N=2) is described as an example.

First, a two-screen video signal S3100 as shown in FIG. 8 is input to the input terminal 3100. Components $A_0$ to $A_N$ and $B_0$ to $B_N$ of the video signal S3100 respectively represent line data. Line data $A_0$ to $A_N$ of the video signal S3100 represent lines of screen A, and line data $B_0$ to $B_N$ represent lines of screen B. The video signal S3100 is input to 4 stages of line delay elements 3101 to 3104 in sequential order, and is made to be the line data S3101, S3102, S3103, and S3104 which are successively delayed by 1 line (1H). The line data S3102 which is positioned at the center of line delayed positions among the video signal S3100 and the delayed line data S3101, S3102, S3103, and S3104 is the contour correction target line data.

In this case, if the video signal S3100 and the delayed line data S3101, S3102, S3103, and S3104 are directly input to the vertical high-pass filter operation circuit 3120, a line group S3106 having 5 taps of $B_1$, $B_0$, $A_0$, $A_1$, and $A_2$ is used for an arithmetic operation of the vertical correction enhancement signal S3120 corresponding to a lower edge-point line $A_0$ of screen A, and a line group S3105 having 5 taps of $B_0$, $A_0$, $A_1$, $A_2$, and $A_3$ is used for an arithmetic operation of the vertical correction enhancement signal S3120 corresponding to $A_1$. In addition, a line group S3107 having 5 taps of $B_2$, $B_1$, $B_0$, $A_0$, and $A_1$ is used for an arithmetic operation of the vertical correction enhancement signal S3120 corresponding to an upper edge-point line $B_0$ of screen B, and a line group S3108 having 5 taps of $B_3$, $B_2$, $B_1$, $B_0$, and $A_0$ is used for an arithmetic operation of the vertical correction enhancement signal S3120 corresponding to $B_1$. In this case, line data $B_0$ and $B_1$ in screen B are used for calculation of the correction enhancement signal S3120 corresponding to edge-point lines $A_0$ and $A_1$ in screen A. Also, line data $A_0$ and $A_1$ in screen A are used for calculation of the correction enhancement signal S3120 corresponding to edge-point lines $B_0$ and $B_1$ in screen B. If screens A and B are video signals which have no correlation, a vertical contour component on which an arithmetic operation has been performed using video signals with no correlation is extracted and then correction is performed, so that a boundary portion between screens A and B becomes video image on which unnatural vertical contour correction is performed.

In order to solve such a problem, selection of line data to be input to the vertical high-pass filter operation circuit 3120 is performed in the line selection circuit 3110. The method of line selection is described below.

In FIG. 8, S3210, S3211, S3213, and S3214 are 4 control signals generated in and output from the line-selection-control-signal generation circuit 3201 from the screen-A vertical video effective period signal S3200 and the screen-B vertical video effective period signal S3300. S3110, S3111, S3112, S3113, and S3114 are line data output from the line selection circuit 3110. S3210 is a control signal which performs selection control of the line data S3110, and becomes HIGH during a 2-line section immediately after the screen-A vertical video effective period signal S3200 was set to LOW, i.e., during a section in which the correction enhancement signal S3120 corresponding to the lower edge-point lines $A_0$ and $A_1$ of screen A is in an arithmetic operation. S3211 is a control signal which performs selection control of the line data S3111, and becomes HIGH during a 1-line section, 1 line after the screen-A vertical video effective period signal S3200 was set to LOW, i.e., during a section in which the correction enhancement signal S3120 corresponding to the lower edge-point line $A_0$ of screen A is in an arithmetic operation. S3213 is a control signal which performs selection control of the line data S3113, and becomes HIGH during a 1-line section, 2 lines after the screen-B vertical video effective period signal S3300 was set to HIGH, i.e., during a section in which the correction enhancement signal S3120 corresponding to the upper edge-point line $B_0$ of screen B is in an arithmetic operation. S3214 is a control signal which performs selection control of the line data S3114, and becomes HIGH during a 2-line section, 2 lines after the screen-B vertical video effective period signal S3300 was set to HIGH, i.e., during a section in which the correction enhancement signal S3120 corresponding to the upper edge-point lines $B_0$ and $B_1$ of screen B is in an arithmetic operation.

S3110, S3111, S3112, S3113, and S3114 are outputs of the line selection circuit 3110. For S3111, the line selection circuit 3110 selects S3101 when the control signal S3211 is LOW, and selects S3102 when HIGH. In addition, for S3110, the line selection circuit 3110 selects S3100 when the control signal S3210 is LOW, and selects S3111 when HIGH. Moreover, for S3113, the line selection circuit 3110 selects S3103 when the control signal S3213 is LOW, and selects S3102 when HIGH. Furthermore, for S3114, the line selection circuit 3110 selects S3104 when the control signal S3214 is LOW, and selects S3113 when HIGH. And, the line selection circuit 3110 directly outputs S3102 as S3112.

Accordingly, a line group S3106' having 5 taps of $A_0$, $A_0$, $A_0$, $A_1$, and $A_2$ is used for the arithmetic operation of the correction enhancement signal S3120 corresponding to the lower edge-point line $A_0$ of screen A; a line group S3105' having 5 taps of $A_0$, $A_0$, $A_1$, $A_2$, and $A_3$ is used for the arithmetic operation of the correction enhancement signal S3120 corresponding to $A_1$; a line group S3107' having 5 taps of $B_2$, $B_1$, $B_0$, $B_0$, and $B_0$ is used for the arithmetic operation of the correction enhancement signal S3120 corresponding to the upper edge-point line $B_0$ of screen B; and a line group S3108' having 5 taps of $B_3$, $B_2$, $B_1$, $B_0$, and $B_0$ is used for the arithmetic operation of the correction enhancement signal S3120 corresponding to $B_1$, so that the correction enhancement signal S3120 which is not affected by line data of another screen can be obtained.

As described above, when calculating the correction enhancement signal S3120 for edge-point lines of the 2 screens, vertical contour correction which is not affected by line data of another screen with no correlation can be performed by controlling the line data S3110 to S3114 input to the vertical high-pass filter operation circuit 3120 in response to the control signal S3210 to S3214.

Note that, in the fourth embodiment, the vertical high-pass filter operation circuit 3120 may be a vertical second-order differential circuit which calculates an average difference between a contour correction target line and lines before and after the pixel.

INDUSTRIAL APPLICABILITY

The present invention is useful if applied to video display devices such as television receivers, liquid crystal displays, and plasma displays.

The invention claimed is:

1. A contour correcting device comprising:
   a plurality of delay elements configured to delay an input video signal;
   a pixel-selection-control-signal generation circuit;
   a pixel selection circuit configured to select outputs of the plurality of delay elements in response to outputs of the pixel-selection-control-signal generation circuit;
   a high-pass filter operation circuit configured to weight and add or subtract pixel data selected by the pixel selection circuit; and
   an adder circuit configured to add an operation result of the high-pass filter operation circuit to the input video signal,
   wherein
   when the pixel selection circuit extracts a contour component in a boundary portion between a horizontal video effective period and a period other than the horizontal video effective period of the input video signal,
   the pixel selection circuit replaces pixel data in the period other than the horizontal video effective period among pixel data input to the high-pass filter operation circuit, with pixel data at an edge-point of the horizontal video effective period.

2. The contour correcting device of claim 1, further comprising:
   a plurality of line delay elements configured to generate line delays to the input video signal;
   a line-selection-control-signal generation circuit;
   a line selection circuit configured to select outputs of the plurality of line delay elements in response to outputs of the line-selection-control-signal generation circuit;

a vertical high-pass filter operation circuit configured to weight and add or subtract pixel data of lines selected by the line selection circuit; and an adder circuit configured to add an operation result of the vertical high-pass filter operation circuit to the input video signal, wherein when the line selection circuit extracts a contour component in a boundary line between a vertical video effective period and a period other than the vertical video effective period of the input video signal, the line selection circuit replaces pixel data of one or more lines in the period other than the vertical video effective period among pixel data of lines input to the vertical high-pass filter operation circuit, each with pixel data at an edge-point line of the vertical video effective period.

3. The contour correcting device of claim 2, wherein the input video signal is a video signal for displaying a plurality of screens (screens A and B), and when the plurality of screens are displayed and contour components are extracted in a boundary portion between screens A and B, in cases where a contour component for a boundary pixel in screen A is extracted, the pixel selection circuit replaces pixel data of screen B among pixel data input to the high-pass filter operation circuit with pixel data at an end-point of screen A, and in cases where a contour component for a boundary pixel in screen B is extracted, the pixel selection circuit replaces pixel data of screen A among pixel data input to the high-pass filter operation circuit with pixel data at an end-point of screen B; and when a plurality of screens are displayed and contour components are extracted in a boundary line between screens A and B, in cases where a contour component is screen A is extracted, the line selection circuit replaces pixel data of one or more lines of screen B among pixel data of lines input to the vertical high-pass filter operation circuit, each with pixel data of a line at an end-point of screen A, and in cases where a contour component in screen B is extracted, the line selection circuit replaces pixel data of one or more lines of screen A among pixel data of lines input to the vertical high-pass filter operation circuit, each with pixel data of a line at an end-point of screen B.

4. The contour correcting device of claim 1, wherein the input video signal is a video signal for displaying a plurality of screens (screens A and B), and when the plurality of screens are displayed and contour components are extracted in a boundary portion between screens A and B, in cases where a contour component for a boundary pixel in screen A is extracted, the pixel selection circuit replaces pixel data of screen B among pixel data input to the high-pass filter operation circuit with pixel data at an end-point of screen A, and in cases where a contour component for a boundary pixel in screen B is extracted, the pixel selection circuit replaces pixel data of screen A among pixel data input to the high-pass filter operation circuit with pixel data at an end-point of screen B.

5. A video display device comprising:
the contour correcting device of claim 4.

6. A video display device comprising:
the contour correcting device of claim 1.

7. A contour correcting device comprising:

a plurality of line delay elements configured to generate line delays to an input video signal;

a line-selection-control-signal generation circuit;

a line selection circuit configured to select outputs of the plurality of line delay elements in response to outputs of the line-selection-control-signal generation circuit;

a vertical high-pass filter operation circuit configured to weight and add or subtract pixel data of lines selected by the line selection circuit; and an adder circuit configured to add an operation result of the vertical high-pass filter operation circuit to the input video signal, wherein when the line selection circuit extracts a contour component in a boundary line between a vertical video effective period and a period other than the vertical video effective period of the input video signal, the line selection circuit replaces pixel data of one or more lines in the period other than the vertical video effective period among pixel data of lines input to the vertical high-pass filter operation circuit, each with pixel data at an edge-point line of the vertical video effective period.

8. The contour correcting device of claim 7, wherein the input video signal is a video signal for displaying a plurality of screens (screens A and B), and when the plurality of screens are displayed and contour components are extracted in a boundary line between screens A and B, in cases where a contour component in screen A is extracted, the line selection circuit replaces pixel data of one or more lines of screen B among pixel data of lines input to the vertical high-pass filter operation circuit, each with pixel data of a line at an end-point of screen A, and in cases where a contour component in screen B is extracted, the line selection circuit replaces pixel data of one or more lines of screen A among pixel data of lines input to the vertical high-pass filter operation circuit, each with pixel data of a line at an end-point of screen B.

9. A video display device comprising:
the contour correcting device of claim 8.

10. A video display device comprising:
the contour correcting device of claim 7.

11. A contour correcting method comprising:

a delaying step of delaying an input video signal by a plurality of delay elements;

a pixel-selection-control-signal generating step;

a pixel selection step of selection outputs of the plurality of delay elements in response to a control signal obtained by the pixel-selection-control-signal generating step;

a high-pass filter operation step of weighting and adding or subtracting pixel data selected by the pixel selection step; and an adding step of adding an operation result of the high-pass filter operation step to the input video signal, wherein when the pixel selection step extracts a contour component in a boundary portion between a horizontal video effective period and a period other than the horizontal video effective period of the input video signal, the pixel selection step replaces pixel data in the period other than the horizontal video effective period among pixel data used in the high-pass filter operation step, with pixel data at an edge-point of the horizontal video effective period.

12. The contour correcting method of claim 11, further comprising:
a line delaying step of delaying the input video signal by a plurality of line delay elements;
a line-selection-control-signal generating step;
a line selection step of selecting outputs of the plurality of line delay elements in response to a control signal obtained by the line-selection-control-signal generating step;
a vertical high-pass filter operation step of weighting and adding or subtracting pixel data of a line selected by the line selection step; and
an adding step of adding an operation result of the vertical high-pass filter operation step to the input video signal, wherein
when the line selection step extracts a contour component in a boundary line between a vertical video effective period and a period other than the vertical video effective period of the input video signal,
the line selection step replaces pixel data of one or more lines in the period other than the vertical video effective period among pixel data of lines used in the vertical high-pass filter operation step, each with pixel data of a line at an edge-point of the vertical video effective period.

13. The contour correcting method of claim 12, wherein the input video signal is a video signal for displaying a plurality of screens (screens A and B), and
when the plurality of screens are displayed and contour components are extracted in a boundary portion between screens A and B,
in cases where a contour component for a boundary pixel in screen A is extracted,
the pixel selection step replaces pixel data of screen B among pixel data used in the high-pass filter operation step, with pixel data at an end-point of screen A, and
in cases where a contour component for a boundary pixel in screen B is extracted,
the pixel selection step replaces pixel data of screen A among pixel data used in the high-pass filter operation step, with pixel data at an end-point of screen B, and
when the plurality of screens are displayed and contour components are extracted in a boundary line between screens A and B,
in cases where a contour component in screen A is extracted,
the line selection step replaces pixel data of a line of screen B among pixel data of lines used in the vertical high-pass filter operation step, each with pixel data of a line at an end-point of screen A, and
in cases where a contour component in screen B is extracted,
the line selection step replaces pixel data of a line of screen A among pixel data of lines used in the vertical high-pass filter operation step, each with pixel data of a line at an end-point of screen B.

14. The contour correcting method of claim 11, wherein the input video signal is a video signal for displaying a plurality of screens (screens A and B), and
when the plurality of screens are displayed and contour components are extracted in a boundary portion between screens A and B,
in case where a contour components for a boundary pixel in screen A is extracted,
the pixel selection step replaces pixel data of screen B among pixel data used in the high-pass filter operation step, with pixel data at an end-point of screen A, and
in cases where a contour component for a boundary pixel in screen B is extracted,
the pixel selection step replaces pixel data of screen A among pixel data used in the high-pass filter operation step, with pixel data at an end-point of screen B.

15. A contour correcting method comprising:
a line delaying step of delaying an input video signal by a plurality of line delay elements;
a line-selection-control-signal generating step;
a line selection step of selecting outputs of the plurality of line delay elements in response to a control signal obtained by the line-selection-control-signal generating steps;
a vertical high-pass filter operation step of weighting and adding or subtracting pixel data of a line selected by the line selection step; and
an adding step of adding an operation result of the vertical high-pass filter operation step to the input video signal, wherein
when the line selection step extracts a contour component in a boundary line between a vertical video effective period and a period other than the vertical video effective period of the input video signal,
the line selection step replaces pixel data of one or more lines in the period other than the vertical video effective period among pixel data of lines used in the vertical high-pass filter operation step, each with pixel data of a line at an edge-point of the vertical video effective period.

16. The contour correcting method of claim 15, wherein the input video signal is a video signal for displaying a plurality of screens (screens A and B), and
when the plurality of screens are displayed and contour components are extracted in a boundary line between screens A and B,
in cases where a contour component in screen A is extracted,
the line selection step replaces pixel data of a line of screen B among pixel data of lines used in the vertical high-pass filter operation step, each with pixel data of a line at an end-point of screen A, and
in case where a contour component in screen B is extracted,
the line step replaces pixel data of a line of screen A among pixel data of lines used in the vertical high-pass filter operation step, each with pixel data of a line at an end-point of screen B.

* * * * *